United States Patent [19]

Okada et al.

[11] 4,323,326

[45] Apr. 6, 1982

[54] SELF-DRILLING SCREW

[76] Inventors: Mitsuo Okada, 576-5, Higashiohtake, Isehara-shi, Kanagawa-ken; Eiichi Nagoshi, 990, Muroda, Chigasaki-shi, Kanagawa-ken; Yoshihisa Matsumoto, 446, Naganuki, Hatano-shi, Kanagawa-ken, all of Japan

[21] Appl. No.: 52,021

[22] Filed: Jun. 25, 1979

[30] Foreign Application Priority Data

Jan. 17, 1979 [JP] Japan .................................. 54-2914

[51] Int. Cl.³ .............................................. F16B 25/00
[52] U.S. Cl. .................................. 411/412; 411/311; 411/416
[58] Field of Search .................. 85/46, 41, 48, 43, 47; 10/10 R, 152 T; 151/22; 411/412, 413, 416, 311, 308

[56] References Cited

U.S. PATENT DOCUMENTS

| 1,336,773 | 4/1920 | Caldwell | 85/47 |
|---|---|---|---|
| 1,651,796 | 12/1927 | Arenz | 85/41 |
| 2,314,391 | 3/1943 | De Vellier | 85/46 X |
| 2,959,086 | 11/1960 | Gerlach et al. | 85/46 |
| 3,233,500 | 2/1966 | De Vellier | 85/46 |
| 3,246,556 | 4/1966 | Phipard, Jr. | 85/46 |
| 3,426,642 | 2/1969 | Phipard, Jr. | 85/46 |
| 3,861,269 | 1/1975 | Laverty | 85/46 |
| 3,942,405 | 3/1976 | Wagner | 85/46 |
| 4,027,573 | 6/1977 | Laverty | 85/46 |

FOREIGN PATENT DOCUMENTS

| 39-14383 | 7/1964 | Japan | 151/22 |
|---|---|---|---|
| 43-10812 | 5/1968 | Japan | 85/43 |
| 48-13799 | 4/1973 | Japan | 85/46 |
| 50-5777 | 3/1975 | Japan | 85/41 |
| 251409 | 5/1926 | United Kingdom | 85/46 |
| 1000111 | 8/1965 | United Kingdom | 85/46 |

Primary Examiner—Ramon S. Britts

[57] ABSTRACT

A self-drilling screw having a single screw thread or a plurality of screw threads of the same angle and height, wherein at least one cutting edge of a drill shape is formed by form rolling at an end face of a forward end of the screw thread at a tapering forward end portion of the self-drilling screw, the cutting edge having a lead angle distinct from that of other portions of the self-drilling screw. The self-drilling screw is formed at the root of the screw thread with elevated areas and depressed areas or major diameter areas and minor diameter areas of polygonal configuration in a zone of a shank extending across the boundary between a parallel portion and a tapering portion to reduce the transverse cross sectional area of the screw thread.

3 Claims, 7 Drawing Figures

SELF-DRILLING SCREW

BACKGROUND OF THE INVENTION

This invention relates to improvements in or relating to self-drilling screws provided with either a single screw thread or a plurality of screw threads equal to each other in angle and height.

In the prior art, it is known to form at least one protuberance in the portion of the screw thread located in the tapering portion at the forward end of a self-drilling screw so that a swaging action may be performed. Known self-drilling screws have had disadvantages in that when no holes are formed beforehand in members which are to be fastened together by a self-drilling screw, difficulties are encountered in using a self-drilling screw for fastening together steel sheets of large thickness due to the limits placed on the capacity of the self-drilling screw by strength and other properties thereof which arise from the shape and dimensions of the forward end portion of the screw.

SUMMARY OF THE INVENTION

The aforementioned disadvantages of the prior art are obviated by the present invention which has as its object the provision of a self-drilling screw including a novel construction in the tapering forward end portion of the shank which enables automatic hole forming and threading of the screw into steel plates of large thickness to be effected.

The aforesaid object of the invention is accomplished by the feature that the screw comprises at least one screw thread having a lead angle at an end face of a forward end of the thread distinct from the lead angle thereof at other portions of the screw to provide at least one cutting edges of a special drill shape, one of the screw threads terminates in the point about the boundary between the parallel portion of the shank and the tapering forward end portion thereof, and the feature that the root of the screw thread is formed to have elevated areas and depressed areas or major diameter areas and minor diameter areas of polygonal configuration in a zone of the shank extending across the boundary between a parallel portion and a tapering portion of the shank to reduce the transverse cross sectional area of the root of the screw thread, for the purpose of reducing the turning torque of the self-drilling screw.

DESCRIPTION OF THE PREFERRED EMBODIMENTS

The embodiments of the invention will now be described by referring to the accompanying drawings.

Figure 1A:
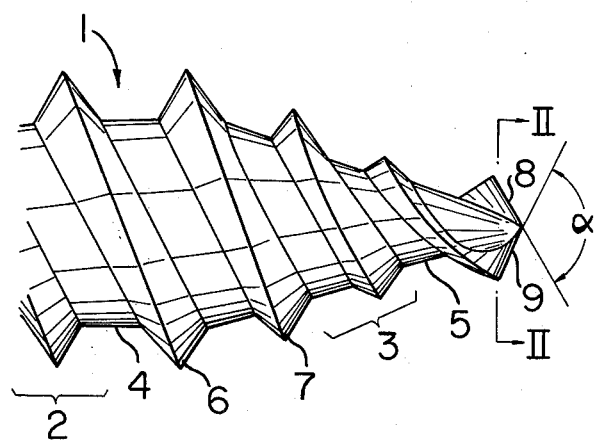
FIG. 1A is a front view of the self-drilling screw comprising one embodiment of the invention.
Figure 2:
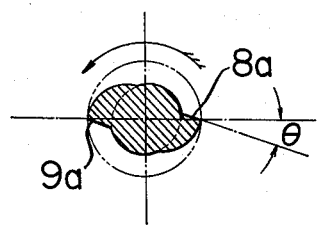
FIG. 2 is a sectional view taken along the line II—II in FIG. 1A and FIG. 1B.
Figure 1B:
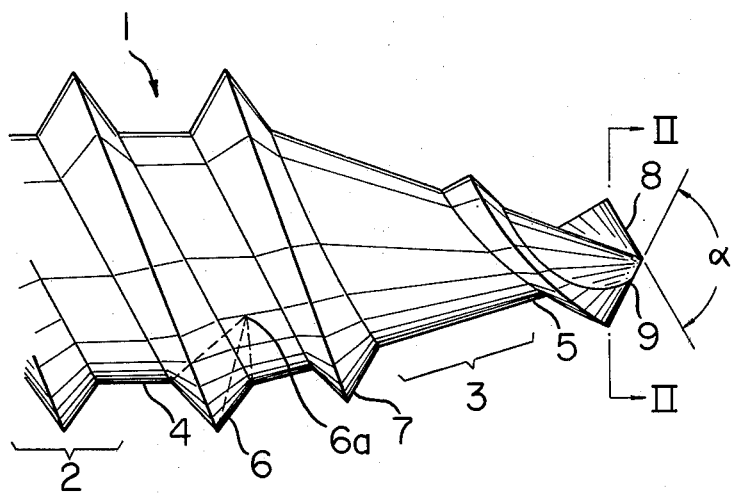
FIG. 1B is a front view of the self-drilling screw comprising another embodiment of the invention.

FIG. 1A shows one embodiment of the self-drilling screw according to the invention generally designated by the reference numeral 1, and FIG. 1B shows another embodiment of the self-drilling screw according to the invention, in said embodiment one of the screw threads 6, 7 being terminated in the point 6a about the boundary between the parallel portion 2 of the shank and the tapering forward end portion 3 thereof. The screw 1 which is formed as a double-thread screw having two screw threads of the same angle and height of thread comprises a shank including a parallel portion 2 and a tapering forward end portion 3. It is to be understood that the screw 1 may be formed as a single-thread screw. The numerals 4 and 5 designates roots of the screw thread. The screw threads of the double-thread are designated by the numerals 6 and 7 in the parallel portion 2 and the tapering forward end portion 3 of the shank and one of the screw threads 6, 7 being terminated in the point 6a about the boundary between the parallel portion 2 of the shank and the tapering forward end portion 3 thereof. The threads 6 and 7 have end faces 8 and 9 at their forward ends respectively which define a conical shape having an angle α. Preferably, the conical angle α is in a range between 90 and 120. The end faces 8 and 9 of the forward ends of the threads 6 and 7 are shown in transverse cross section in FIG. 2 and have two cutting edges 8a and 9a in this zone which are formed by form rolling by varying the lead angle of the threads 6 and 7. The cutting edges 8a and 9a have the same rake angle θ which is negative and preferably as small in value as possible. It is preferred from the point of view of the cutting mechanism that the rake angle be positive. However, in this invention, the rake angle is formed as a negative angle for convenience of working on the blank by form rolling to provide a screw and for reason of maintaining strength of the cutting edges.

Figure 3:
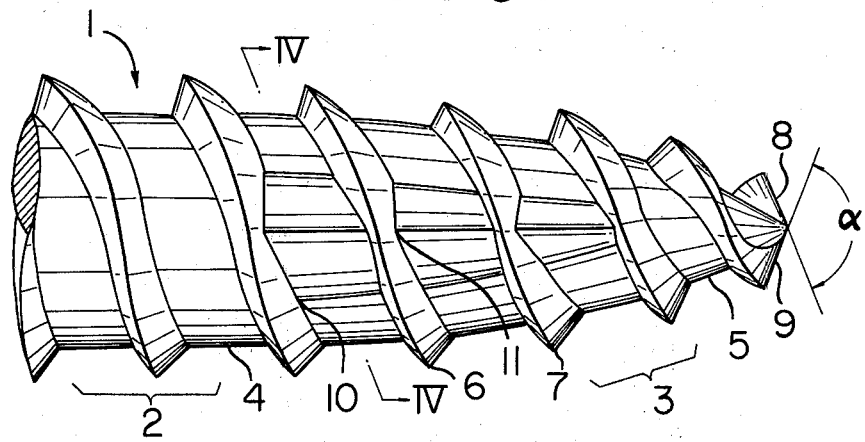
FIG. 3 is a front view of the self-drilling screw comprising another embodiment of the invention.
Figure 4:
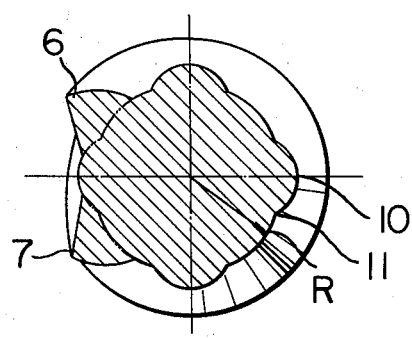
FIG. 4 is a sectional view taken along the line IV—IV in FIG. 3.

In FIG. 3, the roots 4 and 5 of the threads 6 and 7 include normal root diameter areas 11 and reduced root diameter areas 10 extending across the boundary between the parallel portion 2 of the shank and the tapering forward end portion 3 thereof. Thus, in a transverse cross section normal to the center axis of the screw 1, depressed and elevated areas 10 and 11 are formed as shown in FIG. 4, with a result that the transverse cross sectional area of the roots 4 and 5 of the threads 6 and 7 is reduced. The depressed areas 10 are formed to have a smaller radius R than the normal root radius of the screw 1. As shown, four elevated areas 11 having standard root radius and four depressed areas 10 having reduced root radius are located on the circumference of the shank in equidistantly spaced apart relation. However, the invention is not limited to this specific number of the elevated and depressed areas of the roots 4 and 5 of the threads 6 and 7 and the number may be selected as desired in accordance with the shape and, dimensions of the screw and the purpose of use of the screw. The value of the radius R may also be selected as desired to suit the design.

Figure 5:
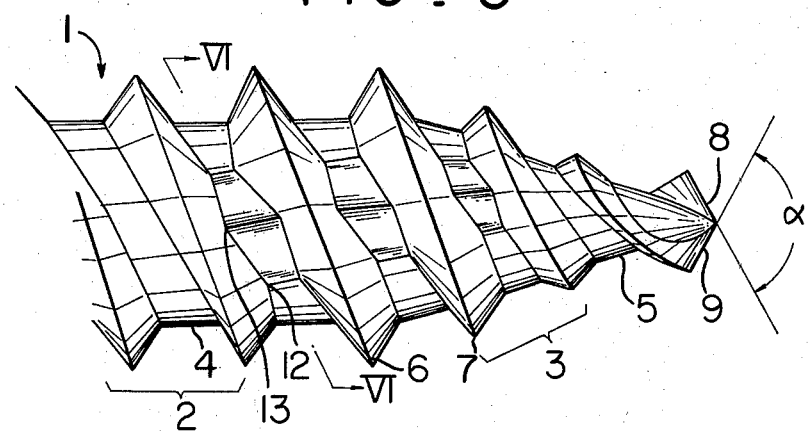
FIG. 5 is a front view of the self-drilling screw comprising still another embodiment of the invention.
Figure 6:
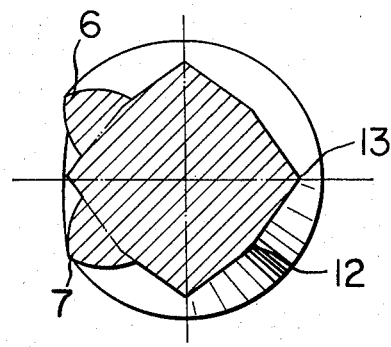
FIG. 6 is a sectional view taken along the line VI—VI in FIG. 5.

In FIG. 5, the roots 4 and 5 of the threads 6 and 7 include normal root diameter portions 13 and reduced root diameter portions 12 extending across the boundary between the parallel portion 2 of the shank and the tapering forward end portion 3 thereof. Thus, in a transverse cross section normal to the center axis of the screw 1, a polygonal configuration having major diameter areas 13 and minor diameter areas 12 12 as shown in FIG. 6 is formed. As shown, the major diameter areas 13 and the minor diameter areas 12 of the polygon are each four in number and arranged equidistantly on the circumference of the shank. However, the invention is not limited to this specific number of the minor and major diameter areas of the polygon and the number may be selected as desired in accordance with the shape and dimensions of the screw and the purpose of use of the screw. The distance between the center axis of the screw 1 and the end of the areas 12 at the roots 4 and 5 of the threads 6 and 7 may be selected as desired to suit the design.

In the self-drilling screw according to the invention, holes are formed in steel plates by the drilling action (cutting action) of the cutting edges 8a and 9a at the end faces 8 and 9 respectively of the threads 6 and 7, and then female screws are formed in the holes by the swaging action of the threads 6 and 7 extending from the tapering forward end portion 3 of the shank to the parallel portion 2 thereof, so that the self-drilling screw 1 finally fastens the steel sheets together.

During operation of the self-drilling screw 1, holes are formed efficiently by the cutting edges 8a and 9a of the end faces 8 and 9 of the threads 6 and 7 when the screw 1 is of the double-thread type and by the cutting edge 8a or 9a when the screw 1 is of the single-thread type. Then, when the threads 6 and 7 perform a swaging action, the area of contact of the screw 1 with the steel sheets is reduced by the presence of the depressed areas 10 and the minor diameter areas 12 of the roots 4 and 5 of the threads 6 and 7 of the screw 1, thereby reducing the turning (cutting) torque. This is conducive to increased cutting efficiency of the screw 1, so that the self-drilling screw 1 can form holes in steel sheets of large thickness, forming female screws in the holes, and fasten the steel sheets together without any difficulty.

What is claimed is:

1. A self-drilling screw having a single screw thread or double screw threads and having a circular cross section at their outer perimeter of the same angle and height, wherein at least one cutting edge of a drill shape is formed by form rolling at an end face of a forward end of the screw thread at a tapering forward end portion of the self-drilling screw, said cutting edge having a lead angle distinct from that of other portions of the self-drilling screw, the screw thread being formed at its root with elevated and depressed areas in a zone of said shank extending across the boundary between a parallel portion and a tapering portion in order to reduce the transverse cross sectional area of the root of the screw thread.

2. A self-drilling screw comprising:
a. a shank portion of circular cross section having a head end and a work entering end;
b. a tapered portion of circular cross section tangentially joining said shank at the work entering end of said shank portion terminating at a drilling point;
c. a screw thread of circular cross section at its outer perimeter and constant angle and pitch extending along a substantial portion of said shank portion and extending along a substantial portion of said conical portion at said same constant angle and pitch to said drilling point;
d. a drill member having a cutting edge formed from said screw thread located at said drilling point.
e. said thread angle in said tapered portion adjacent said drilling point gradually increases terminating in said drill member;
f. said screw thread diameter gradually increases beginning at the end of said drill shape and continuing through said tapered portion reaching its maximum diameter at said work entering end of said shank portion; and
g. said screw thread being formed at its root with elevated and depressed areas in a zone of said shank extending across the boundary between a parallel portion and a tapering portion.

3. A self-drilling screw having a single screw thread or double screw threads of the same angle and height, wherein at least one cutting edge of a drill shape is formed by form rolling at an end face of a forward end of the screw thread at a tapering forward end portion of the self-drilling screw, one of the screw threads terminates in the point about the boundary between a parallel portion of the shank and a tapering forward end, wherein the shank of the screw comprises the parallel portion and the tapered portion, said parallel portion being provided with a screw thread of the same angle and height and the tapered portion of the shank having also screw threads of the same angle and height, but said height of the screw thread being reduced gradually until the tip point of the screw in the range of the forward end portion of the screw, said lead angle in the range of said cutting edge being greater than that in the range of the parallel shank, the screw thread being formed with a circular cross section at its outer perimeter and being formed at its root with a polygonal transverse cross section in a zone of said shank extending across the boundary between a parallel portion and to form a tapering portion in order to reduce comparatively the transverse cross sectional area of the root of the screw thread than that of the other portions of the shank.

* * * * *

UNITED STATES PATENT AND TRADEMARK OFFICE
CERTIFICATE OF CORRECTION

PATENT NO. : 4,323,326
DATED : April 6, 1982
INVENTOR(S) : Mitsuo Okada, Eiichi Nagoshi and Yoshihisa Matsumoto It is certified that error appears in the above—identified patent and that said Letters Patent are hereby corrected as shown below:

On the title page, add -- [73] Assignee: Topura Co., Ltd. Osaka-fu Japan --.

Signed and Sealed this

Tenth Day of August 1982

[SEAL]

Attest:

GERALD J. MOSSINGHOFF

Attesting Officer

Commissioner of Patents and Trademarks